B. V. HALLGREEN.
HOSE.
APPLICATION FILED SEPT. 3, 1912.

1,087,443.

Patented Feb. 17, 1914.

Witnesses

Inventor
Brown V. Hallgreen.
By Joshua R. H. Potts
Attorney

UNITED STATES PATENT OFFICE.

BROWN V. HALLGREEN, OF PHILADELPHIA, PENNSYLVANIA.

HOSE.

1,087,443.  Specification of Letters Patent.  Patented Feb. 17, 1914.

Application filed September 3, 1912.  Serial No. 718,236.

*To all whom it may concern:*

Be it known that I, BROWN V. HALLGREEN, a citizen of the United States, residing at Philadelphia, in the county of Philadelphia and State of Pennsylvania, have invented certain new and useful Improvements in Hose, of which the following is a specification.

My invention relates to improvements in hose, the object of the invention being to provide a hose with an improved outer surface which strengthens the hose longitudinally and transversely and increases the life of the hose by providing relatively wide wearing surfaces to relieve the main portion of the hose of the wear to which it would otherwise be subjected.

A further object is to provide a hose with an outer surface having longitudinal relatively large ribs spaced equidistant around the hose and having smaller longitudinal ribs between them and at regular intervals provide the outer surface of the hose with relatively large annular segmental ribs intersecting the relatively small longitudinal ribs and spaced at their ends from the relatively large longitudinal ribs.

With these and other objects in view, the invention consists in certain novel features of construction and combinations and arrangements of parts as will be more fully hereinafter described and pointed out in the claims.

Figure 1:
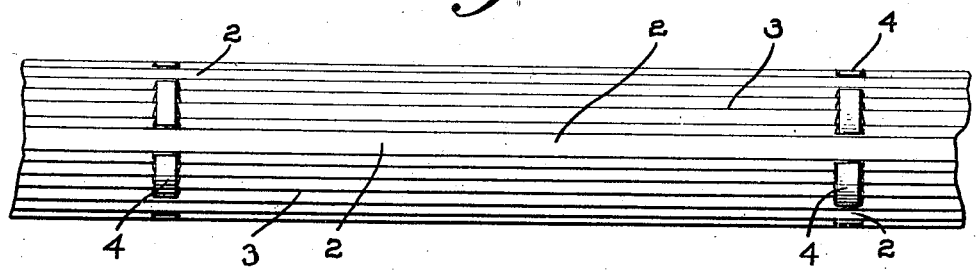
Figure 2:
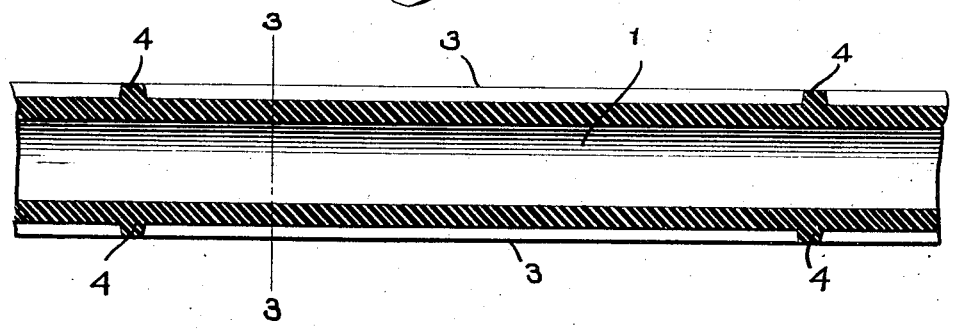
Figure 3:
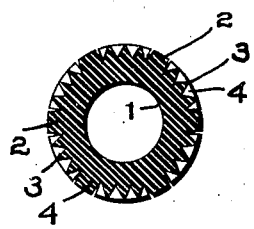

In the accompanying drawings: Figure 1 is a view in side elevation illustrating my improvements. Fig. 2 is a view in longitudinal section. Fig. 3 is a view in cross section on the line 3—3 of Fig. 2.

1 represents the cylindrical body portion of the hose which may be constructed in any approved manner with an outer rubber surface having, at regular intervals properly spaced apart, relatively large integral longitudinal ribs 2, which extend in unbroken lines throughout the length of the hose. Between the ribs 2, relatively small longitudinal ribs 3 are provided on the outer surface of the hose and these ribs 3 are intersected at regular intervals by relatively large annular segmental ribs 4, the ends of the latter spaced from the ribs 2 as clearly shown in Fig. 3. The ribs 2 and 4 are substantially trapezoidal in cross section to give to them a relatively flat extended outer bearing face with slightly inclined sides as shown in Fig. 2, while the ribs 3 are formed with side faces at an acute angle to each other, forming relatively sharp outer edges, so that the ribs 2 and 4 are designed to take up the greater portion of the surface wear on the hose. The ribs not only give lateral and longitudinal strength to the hose, but the ribs 2 and 4 prevent wear of the ribs 3, so that the latter are not quickly worn down to destroy their effectiveness. The ribs 2 and 4 also give strength to the hose in addition to their function of relieving the ribs 3 of wear, and the annular ribs 4 may be located a known distance apart to constitute a lineal measure of the hose and overcome the necessity of measuring the same.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. As a new article of manufacture, a hose having on its outer face a plurality of spaced relatively large longitudinal ribs, segmental annular ribs arranged at regular intervals throughout the length of said hose, the ends of said segmental ribs terminating short of the first mentioned ribs, and a plurality of relatively small longitudinal ribs arranged between the first mentioned longitudinal ribs and intersecting the segmental ribs, substantially as described.

2. As a new article of manufacture, a hose having upon its outer face a plurality of spaced longitudinal ribs extending uninterruptedly throughout its length, segmental annular ribs arranged at regular intervals throughout the length of the hose, a plurality of relatively small longitudinal ribs arranged between and parallel with the first mentioned ribs and intersecting said segmental ribs, the outer faces of all of said ribs lying at the same distance from the central axis of the hose, and the ends of said segmental ribs terminating short of the first mentioned longitudinal ribs, substantially as described.

In testimony whereof I have signed my name to this specification in the presence of two subscribing witnesses.

BROWN V. HALLGREEN.

Witnesses:
H. HALLGREEN,
R. H. KRENKEL.